US009021098B1

(12) United States Patent
Nagle et al.

(10) Patent No.: US 9,021,098 B1
(45) Date of Patent: Apr. 28, 2015

(54) ALLOCATION OF INTERFACE IDENTIFIERS WITHIN NETWORK DEVICE HAVING MULTIPLE FORWARDING COMPONENTS

(75) Inventors: Michael H. Nagle, Holliston, MA (US); Vijay Paul, Bangalore (IN); Pawankumar Harode, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 328 days.

(21) Appl. No.: 13/534,862

(22) Filed: Jun. 27, 2012

(51) Int. Cl.
*G06F 15/173* (2006.01)
*H04L 29/12* (2006.01)

(52) U.S. Cl.
CPC .......... *H04L 61/20* (2013.01); *H04L 29/12207* (2013.01)

(58) Field of Classification Search
CPC ................... H04L 29/12018; H04L 29/12207; H04L 61/20
USPC .......................................................... 709/226
See application file for complete search history.

(56) References Cited

U.S. PATENT DOCUMENTS

| 6,976,154 | B1 |   | 12/2005 | Dyckerhoff et al. |         |
|-----------|-----|---|---------|-------------------|---------|
| 7,184,437 | B1 | * | 2/2007  | Cole et al.       | 370/392 |
| 7,197,549 | B1 | * | 3/2007  | Salama et al.     | 709/223 |
| 7,788,345 | B1 | * | 8/2010  | Sukiman et al.    | 709/220 |
| 8,139,492 | B1 | * | 3/2012  | Peterson et al.   | 370/238 |
| 8,321,567 | B1 | * | 11/2012 | Sheth             | 709/226 |
| 8,793,358 | B1 | * | 7/2014  | Godbole et al.    | 709/223 |
| 2002/0042868 | A1 | * | 4/2002 | Godtland et al.   | 711/209 |
| 2004/0160958 | A1 | * | 8/2004 | Oh                | 370/395.1 |
| 2012/0163196 | A1 | * | 6/2012 | Jansen et al.     | 370/248 |

* cited by examiner

*Primary Examiner* — Jeong S Park
(74) *Attorney, Agent, or Firm* — Shumaker & Sieffert, P.A.

(57) ABSTRACT

In general techniques are described for allocating global identifiers to forwarding units of a network device. A network device having one or more hardware-based microprocessors and an allocation module executable by the microprocessors may implement the techniques. The allocation module may maintain a first map that indicates global identifiers that are allocable to a plurality of forwarding units of the network device, and a second map that indicates local identifiers that are allocated to one of the plurality of forwarding units. The local identifiers may be based at least in part on the global identifiers. The allocation module may allocate to the forwarding unit, a global identifier indicated by the first map that is not allocated to any one of the plurality of forwarding units by comparing the second map to one or more portions of the first map to identify the unallocated global identifier of the first map.

26 Claims, 6 Drawing Sheets

ALLOCATION OF INTERFACE IDENTIFIERS WITHIN NETWORK DEVICE HAVING MULTIPLE FORWARDING COMPONENTS

TECHNICAL FIELD

The disclosure relates to packet-based computer networks and, more particularly, to forwarding packets within computer networks.

BACKGROUND

A computer network is a collection of interconnected computing devices that can exchange data and share resources. Example network devices include layer two devices that operate within the second layer of the Open Systems Interconnection (OSI) reference model, i.e., the data link layer, and layer three devices that operate within the third layer of the OSI reference model, i.e., the network layer. Network devices within computer networks often include a control unit that provides control plane functionality for the network device and forwarding components for routing or switching data units. In some cases, for example, a network device may include a plurality of forwarding units (referred to in some examples as packet forwarding engines (PFEs)) and a switch fabric that collectively provide a forwarding plane for forwarding network traffic.

The control plane functions provided by the control unit include storing network topologies in the form of a routing information base (RIB), executing routing protocols to communicate with peer routing devices to maintain and update the RIB, and providing a management interface to allow user access and configuration of the network device. The control unit maintains routing information that represents the overall topology of the network and defines routes to destination prefixes within the network.

The control unit derives a forwarding information base (FIB) that includes a number of forwarding structures generated by the control unit in accordance with the routing information and control information. The control unit installs the forwarding structures within the data plane to programmatically configure the forwarding components. The data and instructions that constitute the forwarding structures define an internal forwarding path for each incoming packet received by the network device. For example, to generate a route table lookup forwarding structure, the control unit selects routes defined by the network topology and maps packet key information (e.g., destination information and other select information from a packet header) to one or more specific next hop network devices and ultimately to one or more specific output interfaces of interface cards of the network device. In some cases, the control unit may install the forwarding structures into each of the PFEs to update the FIB within each of the PFEs and control traffic forwarding within the data plane.

Forwarding capacity of the network device may be increased or decreased by adding or removing PFEs to the network device. In some examples, the network device can include PFEs with different hardware and/or software versions as PFEs are added and removed from the network device. The PFEs, in some examples, are operably coupled to physical interfaces that send and receive network packets. In some examples, the network device may define one or more logical interfaces that are each associated with a physical interface. The network device may use the logical interfaces to apply, for example, one or more services to network packets processed by the network device. In some examples, PFEs with different hardware and/or software versions may use a common group of logical interfaces to forward network packets.

SUMMARY

The techniques described herein are directed to efficient allocation of "global" identifiers of logical interfaces in a network device. The identifiers are referred to herein as "global identifiers" in that each identifier is unique across a plurality of forwarding units within the network device. Rather than dividing a global space of global identifiers among the different forwarding units when initially configuring a network device, techniques of the disclosure provide for allocation of global identifiers to individual forwarding units on as-needed basis. Techniques of the disclosure may reduce unnecessary constraints that result from dividing the global space by allowing a network device to select unallocated global identifiers of the global space from multiple portions of the global space of identifiers. In this way, any one of multiple global identifiers in different portions of the global space can be allocated to a forwarding unit where each of the multiple global identifiers can satisfy a request for a local identifier at the forwarding unit. Moreover, the techniques may be readily applied even when different versions or types of forwarding units are deployed within the same network device and, therefore, may support interface identifier spaces of differing sizes.

To select an unallocated logical interface of the global identifier space, a network device may maintain a global map that represents the global space of all global identifiers that are allocable to forwarding units. The global map can indicate whether each global identifier is currently allocated to a logical interface of a forwarding unit. In some examples, the network device also maintains a forwarding unit map for each of the forwarding units that may be based on the total quantity of logical interfaces supported by the respective forwarding unit. The forwarding unit map can indicate local identifiers associated with logical interfaces of the forwarding unit. The local identifiers may be based at least in part on the global identifiers (e.g., a local identifier may be a subset of least significant bits of a global identifier). To allocate a global identifier to the forwarding unit, the network device may compare the forwarding unit map to the global map by "windowing" the forwarding map across one or more portions of the global map to identify an unallocated identifier. If the network device determines, based on the comparison, that a global identifier is unallocated in the global map, the network device may allocate the global identifier to the forwarding unit, which may in turn associate the global identifier with a logical interface.

In other examples, if, based on the comparison, no global identifier are unallocated in the current "window" or portion of the global map that is compared to the forwarding unit map, the network device may compare the forwarding unit map across other, different portions of the global map to identify an unallocated global identifier in the global space that can be allocated to the forwarding unit. Windowing the forwarding unit map across the global map to identify a global identifier may enable the network device to select an unallocated logical interface from different portions of the global space for allocation to a forwarding unit. Furthermore, in some examples, windowing the forwarding unit map across the global map to identify a logical interface from different portions of the global map may reduce unnecessary constraints that would otherwise result from dividing the global space according to each forwarding unit. Consequently, techniques of the disclosure may, for example, allocate a single global identifier, which satisfies multiple variable-sized overlapping namespaces. Thus, techniques of the disclosure, in some examples, may allocate a single global identifier so as to increase and/or maximize the number of global identifiers which may be allocated to meet both global identifier uniqueness as well as local identifier limitations and uniqueness. The techniques of the disclosure may therefore allocate a single global identifier, which satisfies both the local and global constraints.

In one example, a method includes maintaining, by a network device, a first map that indicates global identifiers that are allocable to one or more of a plurality of forwarding units of the network device, and a second map that indicates local identifiers that are allocated to a forwarding unit of the plurality of forwarding units. The local identifiers may be based at least in part on the global identifiers. The method may also include allocating to the forwarding unit, by the network device, a global identifier indicated by the first map that is not allocated to any one of the plurality of forwarding units by comparing the second map to one or more portions of the first map to identify the unallocated global identifier of the first map.

In one example, a network device may include a control unit having one or more hardware-based microprocessors and an allocation module executable by the microprocessors. The allocation module may maintain a first map that indicates global identifiers that are allocable to one or more of a plurality of forwarding units of the network device, and a second map that indicates local identifiers that are allocated to a forwarding unit of the plurality of forwarding units. The local identifiers may be based at least in part on the global identifiers. The allocation module may allocate to the forwarding unit, by the network device, a global identifier indicated by the first map that is not allocated to any one of the plurality of forwarding units by comparing the second map to one or more portions of the first map to identify the unallocated global identifier of the first map.

In one example, a non-transitory computer-readable medium may include instructions that, when executed, cause one or more processors of a network device to: maintain a first map that indicates global identifiers that are allocable to one or more of a plurality of forwarding units of the network device, and a second map that indicates local identifiers that are allocated to a forwarding unit of the plurality of forwarding units. The local identifiers may be based at least in part on the global identifiers. The non-transitory computer-readable medium may also include instructions that, when executed, cause one or more processors of a network device to allocate to the forwarding unit, by the network device, a global identifier indicated by the first map that is not allocated to any one of the plurality of forwarding units by comparing the second map to one or more portions of the first map to identify the unallocated global identifier of the first map.

The details of one or more aspects of this disclosure are set forth in the accompanying drawings and the description below. Other features, objects, and advantages of this disclosure will be apparent from the description and drawings, and from the claims.

DETAILED DESCRIPTION

Figure 1:
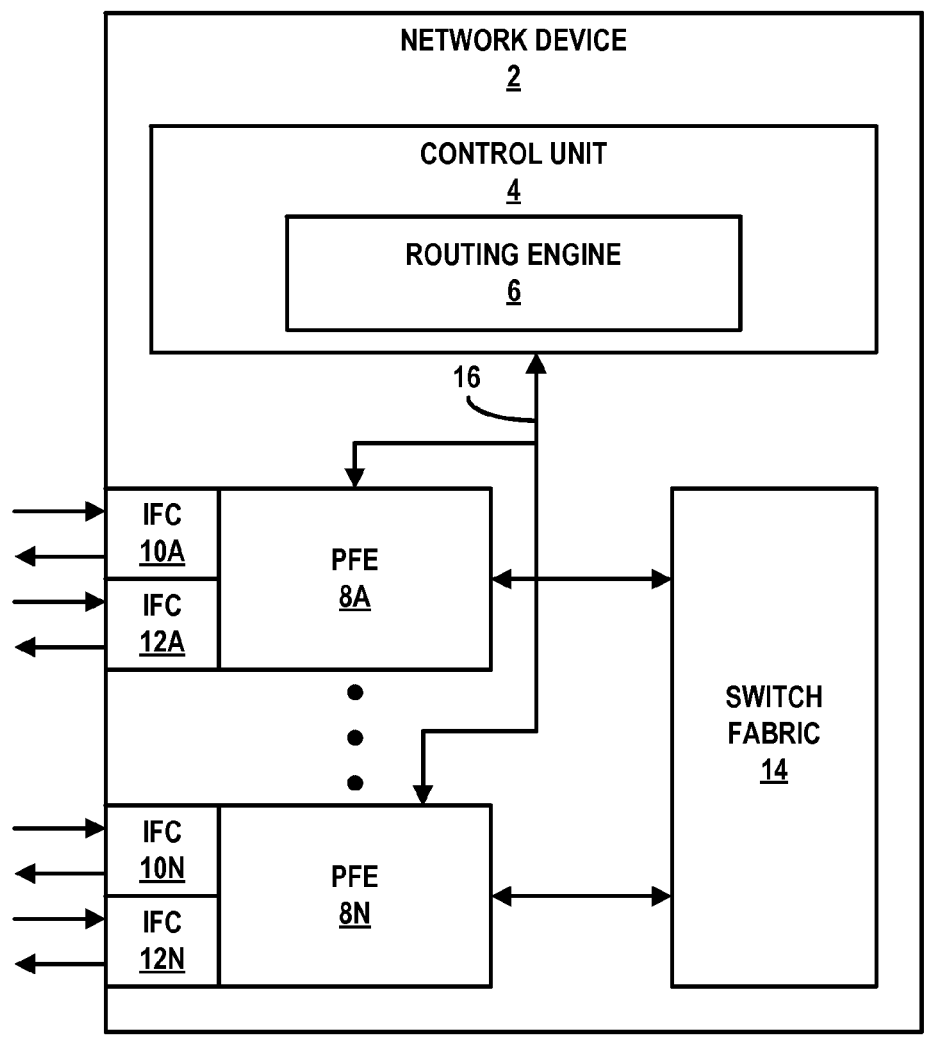
FIG. 1 is a block diagram illustrating an example network device that allocates logical interfaces, in accordance with the techniques described herein.

FIG. 1 is a block diagram illustrating an example network device that allocates logical interfaces in accordance with the techniques described herein. Network device 2, in some examples, may comprise a network device such as a core router, edge router, or other network device. In this example, network device 2 includes a control unit 4 that includes a routing engine 6. Routing engine 6 provides control plane functionality for network device 2. Network device 2 also includes a plurality of forwarding units, also referred to as packet-forwarding engines 8A-8N ("PFEs 8") and a switch fabric 14 that collectively provide a data plane for forwarding network traffic. PFEs 8 receive and send data packets via interface cards 10A-10N ("IFCs 10") and IFCs 12A-12N ("IFCs 12"). In other embodiments, each of PFEs 8 may comprise more or fewer IFCs. Although not shown, PFEs 8 may each comprise a central processing unit (CPU) and a memory. Switch fabric 14 provides a high-speed interconnect for forwarding incoming data packets to the correct one of PFEs 8 for transmission over a network. In some examples, multiple PFEs may be hosted on a line card, which have one or more processors and memory. The one or more processors and memory may maintain a pool of PFEs, each PFE comprising one or more application-specific integrated circuits (ASICs).

Routing engine 6 provides control plane functions for storing network topology in the form of routing tables or other structures, executing routing protocols to communicate with peer routing devices and maintain and update the routing tables, and providing a management interface to allow user access and configuration of network device 2. Control unit 4 provides an operating environment for routing engine 6 and may be implemented solely in software, or hardware, or may be implemented as a combination of software, hardware or firmware. For example, control unit 4 may include one or more processors which execute software instructions. In that case, routing engine 6 may include various software modules or daemons (e.g., one or more routing protocol processes, user interfaces and the like), and control unit 4 may computer-readable storage medium, such as computer memory or hard disk, for storing executable instructions.

Routing engine 6 is connected to each of PFEs 8 by a dedicated internal communication link 16. For example, dedicated link 16 may comprise a 200 Mbps Ethernet connection. Routing engine 6 maintains routing information that describes a topology of a network, and derives a forwarding information base (FIB) in accordance with the routing information. In general, the routing information represents the overall topology of the network. Typically, the routing information defines routes (i.e., series of next hops) through a network to destinations/prefixes within the network learned via a distance-vector routing protocol (e.g., BGP) or defines the network topology with interconnected links learned using a link state routing protocol (e.g., IS-IS or OSPF). In contrast, the FIB is generated based on selection of certain routes within the network and maps packet key information (e.g., destination information and other select information from a packet header) to one or more specific next hops and ultimately to one or more specific output interface ports of IFCs 10, 12. Routing engine 6 may generate the FIB in the form of a radix tree having leaf nodes that represent destinations within the network. U.S. Pat. No. 7,184,437 provides details on an exemplary embodiment of a router that utilizes a radix tree for route resolution, the contents of which is incorporated herein by reference in its entirety.

Routing engine 6 communicates data representative of a software copy of the FIB into each of PFEs 8 to control forwarding of traffic within the data plane. This allows the software FIB stored in memory (e.g., RAM) of in each of PFEs 8 to be updated without degrading packet-forwarding performance of network device 2. In some instances, routing engine 6 may derive separate and different software FIBs for each respective PFEs 8. In addition, one or more of PFEs 8 include application-specific integrated circuits (ASICs) (not shown) that PFE 8 programs with a hardware-copy of the FIB based on the software FIBs (i.e., hardware versions of the software FIBs) copied to each respective PFE 8. In some examples, a forwarding unit includes one or more ASICs.

In some examples, network device 2 can be configured to create logical interfaces for servicing network traffic received at and sent by interfaces 10, 12. Interfaces 10, 12 may be referred to as "physical interfaces" in the present disclosure because such interfaces may represent physical hardware of network device 2. In contrast, logical interfaces may be objects that network device 2 creates and deletes to apply one or more services to network traffic.

As one example of logical interfaces, an administrator and/or automated agent may configure network device 2 to provide a Virtual Private Network (VPN) to a packet flow comprising network packets that are sent from a computing device to network device 2. Initially, routing engine 6 allocates a logical interface for the VPN service. Routing engine 6 may associate the logical interface with the computing device based on the IP address of the computing device. When configuring the logical interface for the VPN service, routing engine 6 may also associate the logical interface with rules and policies for processing IP packets in accordance with the VPN service. Once routing engine 6 has generated the logical interface, routing engine 6 may send configuration information to, for example, PFE 8A, which is then configured according to the configuration information to process packets in accordance with the VPN service. Upon receiving packets from the respective computing device, PFE 8A selects the corresponding logical interface to control processing and forwarding of the packets. As a result, when processing the packets received from the computing device, PFE 8A applies the filters and forwards the IP traffic in accordance with the VPN service. Although the current example illustrates the use of logical interfaces with a VPN service, network device 2 can use logical interfaces to implement any suitable network service.

In some examples, routing engine 6 maintains a global space of global identifiers that routing engine 6 can allocate to PFEs 8. Routing engine 6 may associate each logical interface with a unique global identifier. In some examples, the logical interface may be the unique global identifier. As one example, routing engine 6 maintains a global space of $2^{20}$ unique global identifiers of logical interfaces, wherein each unique global identifier may be a 20-bit value. Each global identifier may be uniquely identifiable in network device 2 across all of PFEs 8. Consequently, PFEs 8 can forward network packets across switch fabric 14 using the globally unique identifiers of the logical interfaces. The identifiers are referred to herein as "global identifiers" in that each identifier is unique across PFEs 8 within network device 2. In other words, the term global identifiers may be viewed as system wide identifiers that are each uniquely recognized by routing engine 6 regardless of the PFE 8 to which the identifier is assigned.

In some examples, forwarding capacity of network device 2 may be increased or decreased by adding or removing PFEs 8 to network device 2. The network device may therefore include PFEs with different hardware and/or software versions as PFEs are added and removed from the network device. In some examples, forwarding structures of different PFEs may support different quantities of logical interfaces. For instance, forwarding structures of PFE 8A may support $2^{20}$ logical interfaces with 20-bit identifiers while a different PFE of PFEs 8A (e.g., a legacy PFE) may only support $2^{16}$ logical interfaces with 16-bit identifiers. Consequently, the global identifiers may include a greater quantity of bits than the 16-bit local identifiers of PFE 8A.

Rather than dividing the global space of identifiers among different PFEs 8 when initially configuring network device 2, techniques of the disclosure provide for allocation of logical interfaces to individual forwarding units on as-needed basis. Consequently, techniques of the present disclosure may reduce and/or eliminate the need to unnecessarily reserve groups of global identifiers of logical interfaces in the global space for specific PFEs 8 although allocation of such global identifiers is not needed at initial configuration. Instead, routing engine 6, can maintain a global map that indicates which global identifiers of the global space are allocated to PFEs 8. In addition, routing engine 6 can maintain per-PFE maps that indicate allocation of local identifiers within each of PFEs 8. Local identifiers may be based at least in part on the global identifiers. For instance, if lookup structures of PFEs 8 support local identifiers with fewer numbers of bits than the global identifiers, PFEs 8 may use a subset of bits of a global identifier as a local identifier within lookup structures of PFEs 8.

Using techniques of the disclosure, routing engine 6, when allocating a global identifier of the global space to a PFE, can compare the per-PFE map of the PFE to a portion or "window" of the global map to determine whether an global identifier is unallocated that includes a subset of bits that can be used as a local identifier in the PFE. If a global identifier is not available in that portion of the global map, routing engine 6 can perform "windowing" of the per-PFE map across different portions of the global map to identify an unallocated logical interface of the global space that can be allocated to the PFE. Techniques of the disclosure are now further described with respect to FIG. 1.

In operation, routing engine 6, as described above, maintains a global map that indicates global identifiers that are allocable to any one of a plurality of PFEs 8 of network device 2. In some examples, the global map indicates all of the global identifiers of a global identifier space that can be or are allocated to PFEs 8. In the examples of the present disclosure, the global map may be implemented as a bitmap. In other examples, the global map may be implemented using any suitable data structure, such as a list, array, database, etc. Each index of an element of the global map corresponds to a global identifier that routing engine 6 may allocate to one or more of PFEs 8.

Each global identifier can uniquely identify a logical interface across all of PFEs 8 of network device 2. Each element of the global map corresponds to a global identifier and therefore indicates whether the corresponding global identifier is allocated to one or more of PFEs 8. As one example, if network device 2 globally supports $2^{20}$ logical interfaces with 20-bit global identifiers of logical interfaces, the element of the global map that corresponds to index "2" may indicate whether the logical interface identified by global identifier "00000000000000000010" is allocated to a PFE. For instance, if the element at index "2" of the global map is set to "1", the element may indicate that the logical interface identified by identifier "00000000000000000010" is allocated to a PFE.

Routing engine 6 also maintains a unique forwarding unit map (referred to as a "per-PFE map" or "PFE map" in various examples) for each of PFEs 8. As one example, the PFE map of PFE 8A indicates the allocation of logical interfaces within PFE 8A. For instance, PFE 8A may support $2^{16}$ logical interfaces, and therefore $2^{16}$ 16-bit local identifiers of logical interfaces. The $2^{16}$ identifiers may be locally unique within PFE 8A and based on a corresponding global identifier that is allocated to PFE 8A. Consequently, the per-PFE map may include $2^{16}$ elements that each indicate whether the respective, corresponding local identifiers are allocated within PFE 8A.

Using the current example to illustrate allocation techniques of the disclosure, routing engine 6 may initially determine a request from an administrator and/or automated agent to establish a logical interface for a VPN service provided at one of PFEs 8. In response to the request, routing engine 6 determines that PFE 8A will be used to provide the VPN service. While lookup structures of PFE 8A use locally unique 16-bit local identifiers of logical interfaces, network device 2 supports 20-bit globally unique identifiers. Techniques of the present disclosure enable routing engine 6 to select a unique 20-bit global identifier for allocation to PFE 8A, such that a local identifier based on the global identifier can be used to uniquely identify a logical interface within PFE 8A. For instance, the lower 16 bits of a global identifier may comprise a local identifier that is unique within the local identifier space of PFE 8A. In the current example, the PFE map of PFE 8A may indicate that 16-bit local identifiers "0-5" (i.e., 0000000000000000-0000000000000101) are already allocated within PFE 8A.

To identify an unallocated global identifier with the lower 16 bits equal to "0000000000000110", routing engine 6 performs a comparison of the PFE map of PFE 8A (e.g., $2^{16}$ elements) to a portion (e.g., $2^{16}$ elements) of the global map. In some examples, the starting point of the global map is based at least in part on a multiple, e.g., $2^{16} \times N$, of the local identifier size for PFE 8A. For instance, routing engine 6 may compare the per-PFE map of PFE 8A to bits 0-65535 of the global map, or in a different example, bits 65536-131072 of the global map. Consequently, for a given index of the per-PFE map, the 16 bits of a local identifier in PFE 8A are equal to the lower 16 bits of a global identifier in the global map. For instance, the local identifier, "0000000000000110" corresponding to index value "6" of the per-PFE map for PFE 8A is equal to the lower 16 bits of the global identifiers corresponding to index values "6", "65542", etc. (including other global identifiers that are multiples of index value "6") of the global map.

Routing engine 6 may compare the global map and per-PFE map by performing a bitwise OR operation of the per-PFE map of PFE 8A and the global map. Upon performing the bitwise OR operation, routing engine 6 determines a one's complement of the result and determines the index in the global map of the lowest-ordered bit that is unallocated. The global identifier of the global map that corresponds to the determined index is selected by routing engine 6 for allocation to PFE 8A. Routing engine 6 allocates the selected global identifier to PFE 8A and sets the element in the global map that corresponds to the global identifier as being allocated.

In some examples, routing engine 6 may determine that each of the identifiers is allocated in the portion of the global map that is compared to the per-PFE map. For instance, in the current example, global identifiers corresponding to bits 0-65535 of the global map (e.g., a first "window" in the global map) may already be allocated to PFEs 8. Consequently, routing engine 6 may compare the per-PFE map of PFE 8A to bits 65536-131072 of the global map (e.g., a second "window" in the global map). Routing engine 6 may determine that, after performing a comparison on the second window, a least significant bit of the result indicates that a global identifier is not currently allocated to one of PFEs 8. Therefore, routing engine 6 allocates the selected global identifier to PFE 8A and sets the element in the global map that corresponds to the global identifier as being allocated. In some examples, PFE 8A associates a physical interface of PFE 8A with the selected global identifier.

By windowing the PFE unit map across the global map to identify a global identifier, techniques of the disclosure may enable network device 2 to select an unallocated logical interface from different portions of the global space for allocation to a forwarding unit. Therefore, in one example, the global identifiers that correspond to local identifiers of one of PFEs 8 can be distributed throughout the global space of global identifiers of network device 2 rather than having each global identifiers allocated to one of PFEs 8 selected from a contiguous group of global identifiers. Furthermore, in some examples, windowing the forwarding unit map across the global map to identify a logical interface from different portions of the global map may reduce unnecessary constraints that would otherwise result from dividing the global space according to each forwarding unit. That is, network device 2, in some examples, need not divide the global identifier space according to the number of PFEs 8 included in network device 2.

Figure 2:
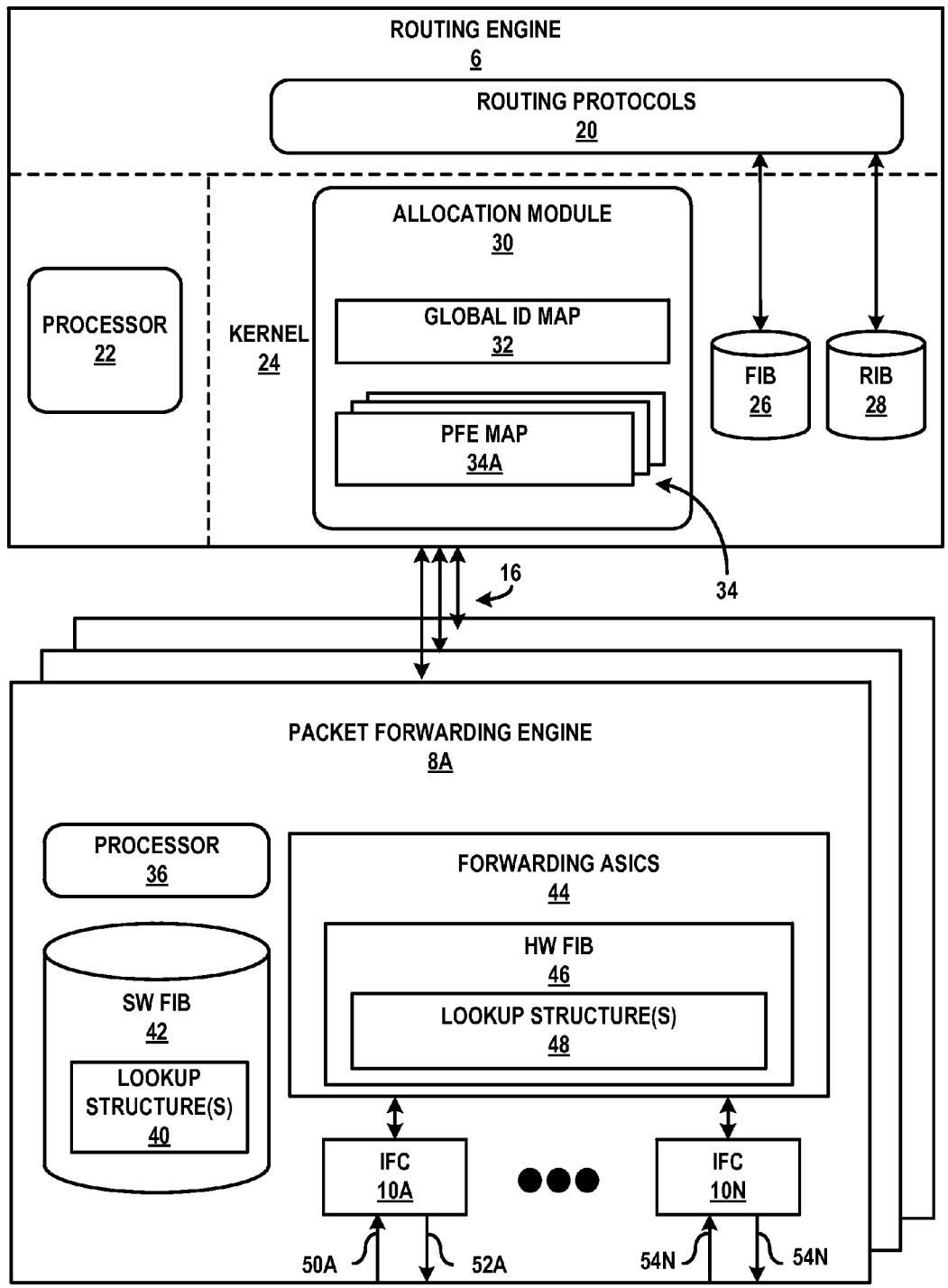
FIG. 2 is a block diagram illustrating in further detail a routing engine and forwarding units of the network device of FIG. 1, in accordance with the techniques described herein.

FIG. 2 is a block diagram illustrating in further detail a routing engine 6 and packet-forwarding engines 8 of the network device 2 of FIG. 1. Routing engine 6 may include various routing protocols 20, such as Multiprotocol Label Switching (MPLS), Resource Reservation Protocol (RSVP), etc. Routing protocols 20 interact with kernel 24 (e.g., by way of API calls) to update routing information base (RIB) 28 based on routing protocol messages received by network device 2. For instance, kernel 24, executing at processor 22, generates forwarding information in the form of forwarding information base (FIB) 26 based on the network topology represented in RIB 28. Kernel 24 can determine the physical interface to be used for forwarding next hops that are included in the forwarding information. Kernel 24 then programs PFEs 8 to install copies of the FIB 26 as software FIBs 42 of PFEs 8. Processor 22, in some examples, includes a CPU and/or memory and can provide processing resources for one or more components including kernel 24, allocation module 30, FIB 26, RIB 28, etc.

Routing engine 6 also includes an allocation module 30. Allocation module 30, in the example of FIG. 2, implements one or more techniques of the present disclosure to allocate global identifiers to PFEs 8. In some examples, allocation module 30 maintains a global identifier map and per-PFE maps in accordance with techniques of the disclosure. Allocation module 30 is further described below in the example of FIG. 2.

FIG. 2 also depicts example embodiments for PFEs 8 in further detail. In some examples, PFE 8A includes a processor 36, software forwarding information base (FIB) 42, forwarding Application-Specific Integrated Circuit (ASICS) 44, and physical interfaces 10A-10N ("IFCs 10"). Processor 36, in some examples, includes a CPU and/or memory and can provide processing resources for one or more components of PFEs 8A including software FIB 42, and forwarding ASICS 44. Processor 36 may execute a microkernel to provide an operating environment for one or more interfaces between components.

As shown in FIG. 2, FIB 42 includes one or more lookup structures 40. Lookup structures 40 can include associations between network prefixes, network routes, next hops, etc. For instance, an example of a lookup structure may include a radix tree. The radix tree may include hierarchically arranged nodes that correspond to keying information of a network packet, such as a network address, interface identifier, etc. In some examples, a leaf node of the radix tree is associated with a next hop, interface identifier, etc. Consequently, when PFE 8A receives a network packet, PFE 8A can use keying information (e.g., source network address, destination network address, protocol, source interface, destination) associated with the network packet to traverse the radix tree and select a next hop that corresponds to the keying information. PFE 8A may then process the network packet in accordance with the next hop.

In another example, one of lookup structures 40 may include a table. The table may include one or more associations between logical interface identifiers, network addresses, interface identifiers, and next hops. In one example, a table may include associations between logical interface identifiers and next hops. Consequently, if PFE 8A processes a network packet and determines a logical interface identifier that corresponds to the keying information of the network packet, PFE 8A may determine a next hop associated with the logical interface identifier using the table. Although lookup structures 40 have been described with respect to radix trees and tables, lookup structures 40 may include any suitable data structures usable to process network packets in PFEs 8.

As shown in FIG. 2, PFE 8A includes ASICS 44. ASICs 44 are microcode-controlled chipsets that are programmably configurable by a processor 36. Specifically, one or more of ASICs 44 are controllable by microcode programmed by processor 36. One example of a network device including a packet processing engine having multiple microcode instruction memories is described in U.S. Pat. No. 6,976,154, the entire contents of which are incorporated herein by reference. Processor 36 programs a hardware FIB 46 into internal memory of ASICs 44 based on software FIB 42. For example, processor 36 may program lookup structures 40 of software FIB 42 into hardware FIG. 46 as lookup structures 48. Consequently, forwarding ASICs 44 processes network packets based on lookup structures 48.

As previously described in FIG. 1, routing engine 6 can allocate global identifiers of logical interfaces to PFEs 8. In some examples, the logical interfaces are associated with one or more next hops. The next hops may include operations performed by PFEs 8 to processes network packets that are associated with the logical interface. As previously described in FIG. 1, routing engine 6 can maintain a space of global identifiers that are unique across PFEs 8. Routing engine 6 may associate a global identifier with a logical interface and allocate the global identifier to one or more of PFEs 8. In this way, as PFEs 8 process and forward network packets across the switch fabric of network device 2, the logical interface is uniquely identifiable.

As described in FIG. 1, network device 2 can include PFEs 8 with different hardware and/or software versions as PFEs 8 are added and removed from network device 8. Consequently, in some examples, one or more of PFEs 8 may support logical interface identifiers that are of a different size (e.g., number of bits) than the global identifiers allocated by routing engine 6. As will be described in the following example of FIG. 2, routing engine 6, implementing techniques of the disclosure can allocate a global identifier for a logical interface to PFE 8A.

In the example of FIG. 2, allocation module 30 maintains a global space of $2^{20}$ (e.g., 1,048,576) 20-bit global identifiers that are unique across PFEs 8. PFE 8A, however, only supports $2^{16}$ (e.g., 65,536) 16-bit local identifiers that are unique within PFE 8A. For instance, lookup structures 48 may include a table of 65,536 entries that associate 16-bit local identifiers of logical interfaces to next hops. Consequently, the 20-bit global identifiers in the example of FIG. 2 are wider than the 16-bit local identifiers supported by PFEs 8A.

As shown in FIG. 2, global identifier map 32 may be a bitmap that indicates whether logical interface identifiers are currently allocated to PFEs 8. Global identifier map 32 can include a quantity of elements equal to the total quantity of global identifiers supported by network device 2. In the example of FIG. 2, global identifier map 32 includes $2^{20}$ (e.g., 1,048,576) elements because network device 2 supports $2^{20}$ identifiers that are each 20-bits. Each element of global identifier map 32 is addressable by an index value that corresponds to a global identifier of a logical interface. Each element can be set to indicate whether the global identifier associated with the index value is allocated. For instance, element 65,536 of global identifier map 32 indicates whether global identifier 65,536 is currently allocated to one or more of PFEs 8.

Allocation module 30 also maintains PFE maps 34. Each of PFE maps 34 corresponds to one of the PFEs of PFEs 8. As one example, PFE map 34A includes a quantity of elements equal to the total quantity of logical interface identifiers supported by PFE 8A. In the example of FIG. 2, PFE map 34A includes $2^{16}$ (e.g., 65,536) elements because PFE 8A supports $2^{16}$ identifiers that are each 16-bits. Each element of PFE map 34A is addressable by an index value that corresponds to a 16-bit identifier. Each element can be set to indicate whether the 16-bit identifier associated with the index value is allocated to a PFE. The 16-bit identifiers used by PFE 8A in lookup structures 48 are each locally unique within PFE 8A. However, each 16-bit identifier corresponds to a 20-bit global identifier allocated by routing engine 6 to PFE 8A. That is, when routing engine 6 allocates a global identifier, PFE 8A receives the 20-bit global identifier from routing engine 6 but uses a subset of bits (e.g., the 16 least significant bits) of the global identifier that are locally unique within PFE 8A in lookup structures 48.

As will be further described below in the example of FIG. 2, software FIB 42 may include data that indicates a mapping and/or translation between the 20-bit global identifier and the 16-bit locally unique identifier. Therefore, when PFE 8A performs a lookup and identifies a 16-bit identifier of a logical interface in lookup structures 48, PFE 8A can determine the 20-bit global identifier that corresponds to the 16-bit identifier. PFE 8A can then use the 20-bit identifier when forwarding the network across the switch fabric or further processing the network packet. In this way, PFE map 34A represents the allocation of global identifiers to PFE 8A such that whenever a global identifier is assigned to PFE 8A, bit number ((global identifier) % (total number of local identifiers supported by PFE 8A)) is set. In other words, if global identifiers 1, 5, 65538 and 131078 of the global space are allocated to PFE 8A then PFE map 34A would have bits 1, 5, 2 and 6 set, corresponding respectively to 1% 64K, 5% 64 k, 65538% 64 k and 131078% 64 k.

Allocation module 30 may use global identifier map 32 and PFE maps 34 to perform techniques of the present disclosure. For instance, initially an administrator and/or automated agent may perform one or more actions to initiate the allocation of a logical interface to PFE 8A. As one example, an administrator may wish to apply a VPN service to a packet flow received by PFE 8A from a computing device. Consequently, the administrator may provide a user input that indicates the request to establish the VPN service. The VPN service may use a logical interface to apply one or more filters to network packets received by PFE 8A.

In some examples, allocation module 30 determines whether PFE 8A supports 20-bit identifiers. For instance, allocation module 30 can request data from PFE 8A that indicates whether PFE 8A supports 20-bit identifiers. The data from PFE 8A may indicate the bit-width of identifiers supported by PFE 8A, the quantity of identifiers supported by PFE 8A, a version number of PFE 8A, etc. In some examples, the version number may indicate a hardware, software, and/or firmware version of PFE 8A. In any case, upon receiving the data from PFE 8A, allocation module 30 determines that PFE 8A supports $2^{16}$ (e.g., 65,536) 16-bit identifiers. If a PFE map for PFE 8A does not exist, allocation module 30 can create PFE map 34A having 65,536 elements, otherwise, if PFE map 34A does exist, allocation module 30 can begin searching for an unallocated global identifier that can be allocated to PFE 8A.

Allocation module 30, in some examples, determines PFE map 34A is associated with PFE 8A. Upon determining PFE map 34A, allocation module 30 can compare PFE map 34A to a portion of global map 30 to identify an unallocated global identifier. While PFE 8A requires a locally unique 16-bit local identifier to associate with a logical interface for the VPN service, routing engine 6 supports 20-bit globally unique identifiers. Routing engine 6 can therefore select an unallocated unique 20-bit global identifier for allocation to PFE 8A, such that the lower 16 bits of the global identifier are unique within the local identifier space of PFE 8A. Because the space of global identifiers includes $2^{20}$ identifiers, there are for a given 16-bit local identifier, 16 (i.e., $2^{20-16}$) global identifiers in the global space that include the 16-bit local identifier as the 16 least significant bits.

To perform the comparison of PFE map 34A to a portion of global identifier map 32, allocation module 30 determines a starting index value of an element of global identifier map 32 that is compared with the first element of PFE map 34A. In some examples, the starting index value of global identifier map 32A is based at least in part on a multiple, e.g., $2^{16} \times N$, of the local identifier size for PFE 8A. For instance, allocation module 30 may compare the elements of PFE map 34A to elements 0-65535 of the global map, or in a different example, bits 65536-131072 of global identifier map 32. Consequently, for a given index of PFE map 34A, the 16 bits of a local identifier in PFE 8A are equal to the lower 16 bits of a 20-bit global identifier in the global map that corresponds to the given index. For instance, the lower 16 bits of a 20-bit global identifier corresponding to index 2 of global identifier map 32 are equal to the 16-bits of a 16-bit local identifier corresponding to index 2 of PFE map 34A.

Once allocation module 30 has determined the starting index value of global identifier map 32A, allocation module 30 performs the comparison of PFE map 34A to the portion of global identifier map 32A starting with the starting index value. In some examples, each portion of global identifier map 32 may be referred to as a "window" of global identifier map 32. In the current example, bits 0-65535 may be referred to as window 1, bits 65536-131072 may be referred to as window 2, etc.

For purposes of illustration, the starting index value of global identifier map 32 for the comparison is 65536 in the example of FIG. 2. Consequently, bits 0-65535 of PFE map 34A are compared to bits 65536-131072 of global identifier map 32. To perform the comparison, allocation module 30 performs a bitwise OR operation of bits 0-65535 of PFE map 34A and bits 65536-131072 of global map 32. Allocation module 30 then performs a 1's complement on the result of the OR operation of PFE map 34A and global identifier map 32. Upon determining the 1's complement result, allocation module 30 determines the least significant bit in the 1's complement result that indicates an unallocated identifier. For instance, the least significant bit of the 1's complement result indicating an unallocated identifier may be a '1'.

Once allocation module 30 has determined the least significant bit of the 1's complement result, allocation module 30 determines the index value of global identifier that corresponds to the least significant bit in the 1's complement result that indicates the unallocated identifier.

The operations performed by allocation module 30 to perform the comparison may be illustrated in the following pseudo code (where global identifier map 34 includes 16 "windows", e.g., windows 1, 2, 3, . . . 16, as described in FIG. 2):

value=Least_Significant_Bit(~(global identifier map | PFE map))

if(value indicates index of unallocated identifier) global identifier value=value+(N−1)*window-size (where N is the window number)

else

No unallocated global identifier in this window so try in the next window (N=(N+1)% num_windows, where num_windows equals the number of windows, e.g, 16 windows)

As can be seen from the example pseudo code, allocation module 30 searches a window for an unallocated global identifier. If all of the global identifiers in a window are allocated to PFEs 8, then allocation module 30 may compare PFE map 34A to a different window of global identifier map 32. For instance, allocation module 30 may compare PFE map 34A to the next sequential window (e.g., window 3) in global identifier map 32. In other examples, allocation module 30 may compare PFE map 34A to a random, different window of global identifier map 32 (e.g., window 7).

Once allocation module 30 has identified an unallocated global identifier upon comparing PFE map 34A to one or more portions of global identifier map 32, allocation module 30 sends the global identifier to PFE 8A. Allocation module 30 sets the element of global map 32 that corresponds to the global identifier from unallocated to allocated. In some examples, allocation module 30 also sets the element of PFE map 34A that corresponds to the lower 16-bits of the 20-bit global identifier from unallocated to allocated. Consequently, PFE map 34A indicates that a local identifier matching the lower-16 bits of the 20-bit global identifier is allocated to PFE 8A.

Upon determining the global identifier, allocation module 30 determines filter information that is associated with the VPN service. In some examples, the filter information may be one or more instructions that specify filter operations representing the filters. Allocation module 30 generates data in FIB 26 that may be sent to PFE 8A, to associate the filters with a logical interface that is identified by the global identifier.

Upon receiving the data from FIB 26, PFE 8A may generate a data structure that comprises the logical interface. In some examples, the logical interface may be any suitable data structure, such as a queue, array, etc. In other examples, the logical interface be the global identifier itself, which is associated with processing operations in forwarding structures of PFE 8A. In any case, PFE 8A associates the global identifier with the logical interface, such that the global identifier identifies the logical interface. Additionally, PFE 8A associates the filters with the logical interface. PFE 8A further uses the data from FIB 26 to generate lookup structures 40. For instance, lookup structures 40 include a radix tree. The radix tree may include leaf nodes that can be determined based on keying information included in network packets. Each leaf node may include data, such as a next hop. Consequently, as PFE 8A receives network packets, keying information of the network packets can be used to select next hops.

In the current example, PFE 8A configures the radix tree such that a leaf node of the radix tree includes the lower 16-bits of the 20-bit global identifier that is associated with the logical interface. PFE 8A further configures the radix tree such that leaf node is associated keying information of packets in the network flow associated with the VPN service. PFE 8A also configures a table in lookup structures 40 that includes associations between 16-bit identifiers (that comprise the lower 16-bits of the 20-bit global identifiers) and next hops. PFE 8A associates the lower 16-bits of the 20-bit global identifier selected by allocation module 30 with a next hop that corresponds to the filters for the VPN service. In some examples, the next hop comprises one or more instructions of the filters. Once PFE 8A has configured lookup structures 40, processor 36 configures lookup structures 48 of hardware FIB 46 based on lookup structures 40.

When a network packet is received by physical interface 10A, forwarding ASICs 44 determine keying information included in the packet header of the network packet. Forwarding ASICs 44 use the keying information to traverse the radix tree in lookup structures 48 to identify a leaf node. In the current example, the keying information corresponds to the leaf node that includes the 16-bit identifier of the logical interface associated with filters for the VPN service. Consequently, forwarding ASICs 44 uses the 16-bit identifier to query the table of associations in lookup structures 48 between next hops and 16-bit identifiers. Forwarding ASICs 44 determines a next hop associated with the 16-bit identifier. The next hop may be one or more filter operations for the VPN service. Forwarding ASICs 44 apply the one or more filter operations to the network packet. In some examples, forwarding ASICs 44 may determine multiple next hops when processing the network packet.

In any case, one of the next hops may be a forwarding next hop that causes forwarding ASICs 44 to forward the network packet to a different one of PFEs 8. Consequently, forwarding ASICs 44 determine the 20-bit global identifier of the logical interface based on the 16-bit identifier included in lookup structures 48. Upon determining the 20-bit global identifier of the logical interface, forwarding ASICs 44 forwards the network packet with the 20-bit global identifier across the switch fabric to the different one of PFEs 8 specified by the forwarding next hop. In some examples, the PFE receiving the network packet may determine the 20-bit global identifier and apply one or more operations based on the value of the global identifier (e.g., based on the network packet's association with the logical interface).

Although examples of the present disclosure illustrate a PFE that uses 16-bit values and a 20-bit global identifier space, other possible local identifier bit-widths and global identifier bit-widths may also be used in accordance with techniques of the disclosure. Therefore, techniques of the disclosure do not require that all window sizes are the same for each of the PFEs. Consequently, different PFEs could have different requirements on the number of supported local identifiers (e.g., and the bit-width of local identifiers). The notion of window sizes for global map 32 is logical and therefore may be adaptable to a plurality of different PFEs having different local identifier bit-widths in a single network device.

Figure 3:
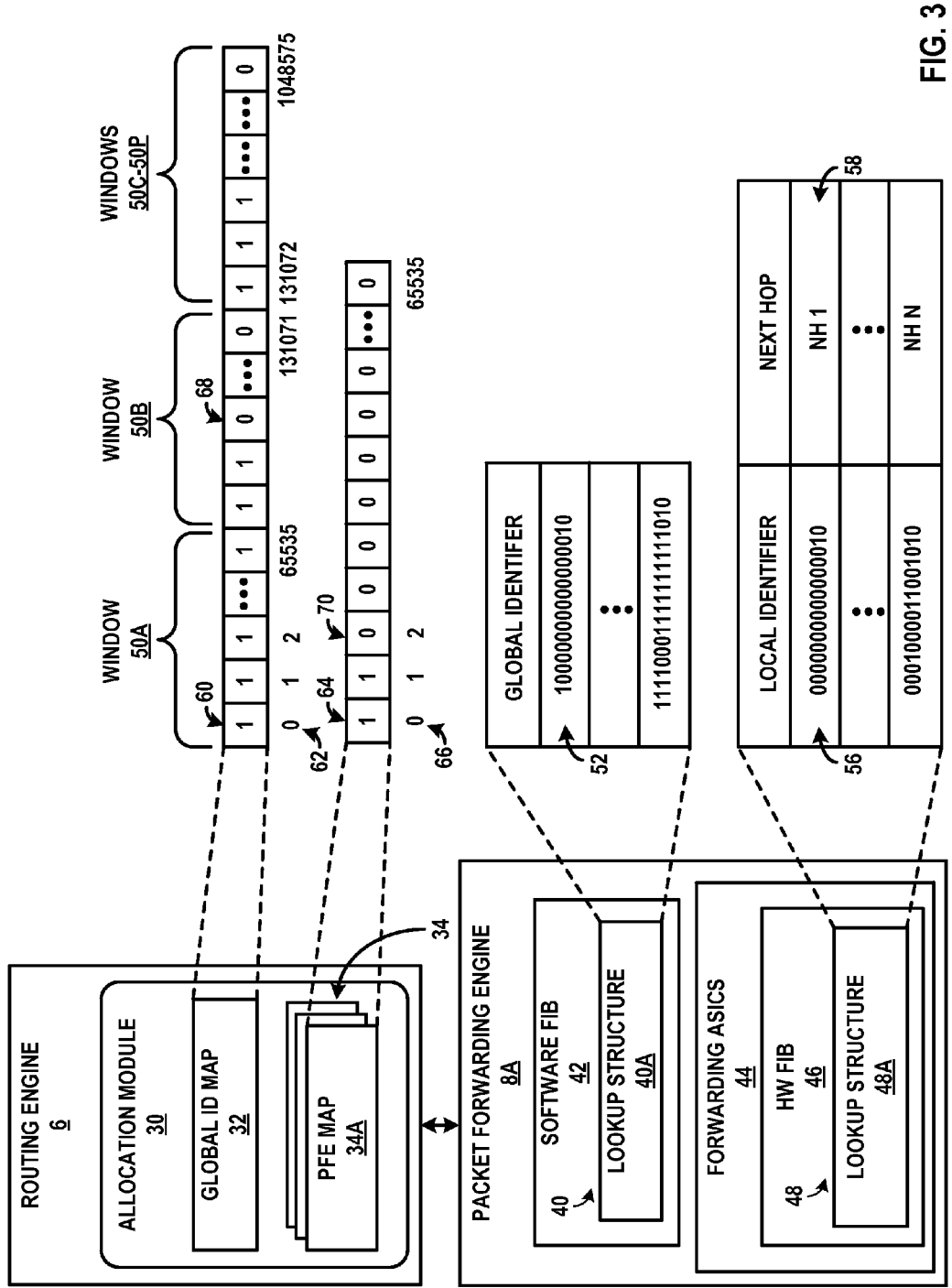
FIG. 3 is a block diagram illustrating in further detail a global identifier map and forwarding unit map of the network device of FIGS. 1 and 2, in accordance with techniques of the disclosure.

FIG. 3 is a block diagram illustrating in further detail global identifier map 32 and PFE map 34A of the network device 2, in accordance with techniques of the disclosure. FIG. 3 includes routing engine 6 and packet forwarding engine 8 as described in FIGS. 1 and 2. Routing engine 6 includes allocation module 30, which further includes global identifier map 32 and PFE map 34A included in PFE maps 34. PFE 8A includes software FIB 42 and lookup structure 40A. PFE 8A also includes forwarding ASICs 44, hardware FIB 46, and lookup structure 48A. The components and structures illustrated in FIG. 3 may be similar to or the same as the components and structures illustrated in FIGS. 1 and 2 of the disclosure. In some aspects, the components and structures illustrated in FIG. 3 may be different from the components and structures illustrated in FIGS. 1 and 2.

Techniques of the present disclosure to allocate a global identifier of a logical interface as described in FIG. 2 are now further illustrated using global map 32 and PFE map 34A in FIG. 3. Initially, routing engine 6 determines that a logical interface is needed by PFE 8A to process network packets according to a VPN service. Consequently, allocation module 30 determines whether PFE 8A can support 20-bit global identifiers in forwarding ASICs 44. Allocation module 30, in the current example, determines that PFE 8A supports $2^{16}$ (e.g., 65,536) 16-bit identifiers of logical interfaces.

Allocation module 30 then determines that PFE map 34A is associated with PFE 8A. As shown in FIG. 3, PFE map 34A is a bitmap that includes 65,536 elements that are addressable by index values 0-65,535. As shown in FIG. 3, element 64 is addressable by index value 66 (e.g., "0"). In some examples, the index value can be the value of the identifier. In some examples, element 64 can store a value of "0" or "1" to indicate whether the identifier corresponding to the index value is allocated or unallocated, respectively. Thus, allocation module 30 can set element 64 to a value of "1" to indicate that an identifier is allocated to one of PFEs 34.

Upon determining PFE map 34A, allocation module 30 can compare PFE map 34A to a portion or "window" of global map 30 to identify an unallocated global identifier. In the examples of FIGS. 1-3, routing engine 6 supports $2^{20}$ (e.g., 1,048,576) 20-bit global identifiers of logical interfaces. Therefore, global identifier map 32, implemented as a bitmap in FIG. 3, includes 1,048,576 elements. The 1,048,576 elements are addressable by index values 0-1,048,575. As shown in FIG. 3, element 60 is addressable by index value 62 (e.g., "0"). In some examples, the index value can be the value of the global identifier. In some examples, element 60 can store a value of "0" or "1" to indicate whether the global identifier is allocated or unallocated, respectively. Thus, allocation module 30 can set element 64 to a value of "1" to indicate that a global identifier is allocated to one of PFEs 34.

In the current example, PFE 34A supports 16-bit identifier values. Allocation module 30 may therefore compare PFE map 34A across one or more of windows 50A-50P (herein "windows 50") to identify an unallocated identifier. Each of windows 50 includes a quantity of bits that are equal to a quantity of bits of PFE map 34A, i.e., 65,536 elements. If allocation module 30 determines, for example, that a window of global identifier map 32 does not include any unallocated global identifiers, allocation module 30 can compare PFE map 34A to one or more different windows 50 to identify an unallocated identifier.

To perform the comparison of PFE map 34A to a portion of global identifier map 32, allocation module 30 determines a starting index value of an element of global identifier map 32 that is compared with the element 66 of PFE map 34A. In some examples, the starting index value of global identifier map 32A is based at least in part on a multiple, e.g., $2^{16} \times N$, of the local identifier size for PFE 8A. For instance, allocation module 30 may compare the elements of PFE map 34A to elements 0-65535 of the global map, or in a different example, bits 65536-131072 of global identifier map 32. Consequently, for a given index of PFE map 34A, the 16 bits of a local identifier used in PFE 8A are equal to the lower 16 bits of a 20-bit global identifier in the global map that corresponds to the given index value.

In the example of FIG. 3, allocation module 30 selects index 62 of global identifier map 32A to initially compare PFE map 34A to window 50A of global identifier map 32A. Consequently, bits 0-65535 of PFE map 34A are compared to bits 0-65535 of global identifier map 32. To perform the comparison, allocation module 30 performs a bitwise OR operation of bits 0-65535 of PFE map 34A and bits 0-65535 of global map 32. Allocation module 30 then performs a 1's complement on the result of the OR operation of PFE map 34A and global identifier map 32.

Upon determining the 1's complement result, allocation module 30 determines the least significant bit in the 1's complement result that indicates an unallocated identifier. In the example of FIG. 3, all of the elements included in window 50A indicate that the global identifiers associated with the elements are allocated to PFEs 8. For instance, each bit of the 1's complement result indicates an allocated identifier by a '0'. Therefore, no global identifiers are included in window 50A that can be allocated to PFE 8A. Consequently, allocation module 30 compares PFE map 8A to window 50B.

Allocation module 30 next performs a bitwise OR operation of bits 0-65535 of PFE map 34A and bits 65536-131071 of global map 32. Upon performing the comparison, allocation module 30 determines a 1's complement of the result. Allocation module 30 then determines that element 68 of window 50B indicates that the global identifier associated with the element is unallocated. The global identifier may be the index value, "65538," that corresponds to element 68. Allocation module 30 may then allocate global identifier "65538" and set element 68 to "1" to indicate that global identifier "65538" is allocated. Allocation module 30 may also set element 70 to "1" as allocated because the lower 16 bits of global identifier "65538" are equal to the 16 bits of the index value (e.g., "2") that is associated with element 70 of PFE map 34A.

Upon selecting global identifier "65538," routing engine 6 may configure lookup structures in routing engine 6. For instance, as described in FIG. 2, routing engine 6 can generate a radix tree that includes the lower 16-bits of global identifier "65538" as a leaf node. Routing engine 6 can associate keying information of network packets in a packet flow with the leaf node. The packet flow may be associated with the VPN service configured by routing engine 6 that uses the logical interface. Routing engine 6 can further generate associate one or more next hops with the lower 16 bits of "65538."

In some examples, routing engine 6 sends data that indicates the generated lookup structures to PFE 8A. PFE 8A stores the data in software FIB 42 in lookup structures 40 that include lookup structure 40A. PFE 8A can further determine that routing engine 6 has allocated a 20-bit global identifier to identify a logical interface and that PFE 8A supports 16-bit identifiers. PFE 8A can store global identifier "65538" as global identifier 52 in lookup structure 40A. PFE 8A later uses global identifier 52 to forward network packets across the switch fabric in network device 2.

PFE 8A also configures hardware FIB 46 to include lookup structures 48. Lookup structures 48 include the radix tree configured with the lower 16-bits of global identifier "65538." Lookup structure 48 illustrates the table of associations between 16-bit identifiers (i.e., the lower 16-bits of 20-bit global identifiers) and next hops. As shown in lookup structure 48, local identifier 56 includes the lower 16 bits of global identifier 52, i.e., global identifier "65538." Local identifier 56 is associated with next hop 58. Next hop 58 may be data specifying one or more filter operations associated with the VPN service provided by PFE 8A to a packet flow.

When a network packet is received by PFE 8A via a physical interface, forwarding ASICs 44 determine keying information included in the packet header of the network packet. Forwarding ASICs 44 use the keying information to traverse the radix tree in lookup structures 48 to identify a leaf node. In the current example, the keying information corresponds to the leaf node that includes the 16-bit identifier (e.g., local identifier 16) of the logical interface associated with filters for the VPN service. Consequently, forwarding ASICs 44 uses local identifier 16 to query associations in lookup structure 48A between next hops and 16-bit identifiers. Forwarding ASICs 44 determines next hop 58 associated with local identifier 16. Next hop 58 may be one or more filter operations for the VPN service. Forwarding ASICs 44 apply the one or more filter operations to the network packet. In some examples, forwarding ASICs 44 may determine multiple next hops when processing the network packet.

In any case, one of the next hops of lookup structures 48 may be a forwarding next hop that causes forwarding ASICs 44 to forward the network packet to a different one of PFEs 8. Consequently, forwarding ASICs 44 determine the 20-bit global identifier of the logical interface in lookup structure 40A based on the 16-bit identifier included in lookup structures 48. Upon determining the 20-bit global identifier of the logical interface, forwarding ASICs 44 forward the network packet with the 20-bit global identifier across the switch fabric to the different one of PFEs 8 specified by the forwarding next hop. In some examples, the PFE receiving the network packet may determine the 20-bit global identifier and apply one or more operations based on the value of the global identifier (e.g., based on the network packet's association with the logical interface).

Figure 4:
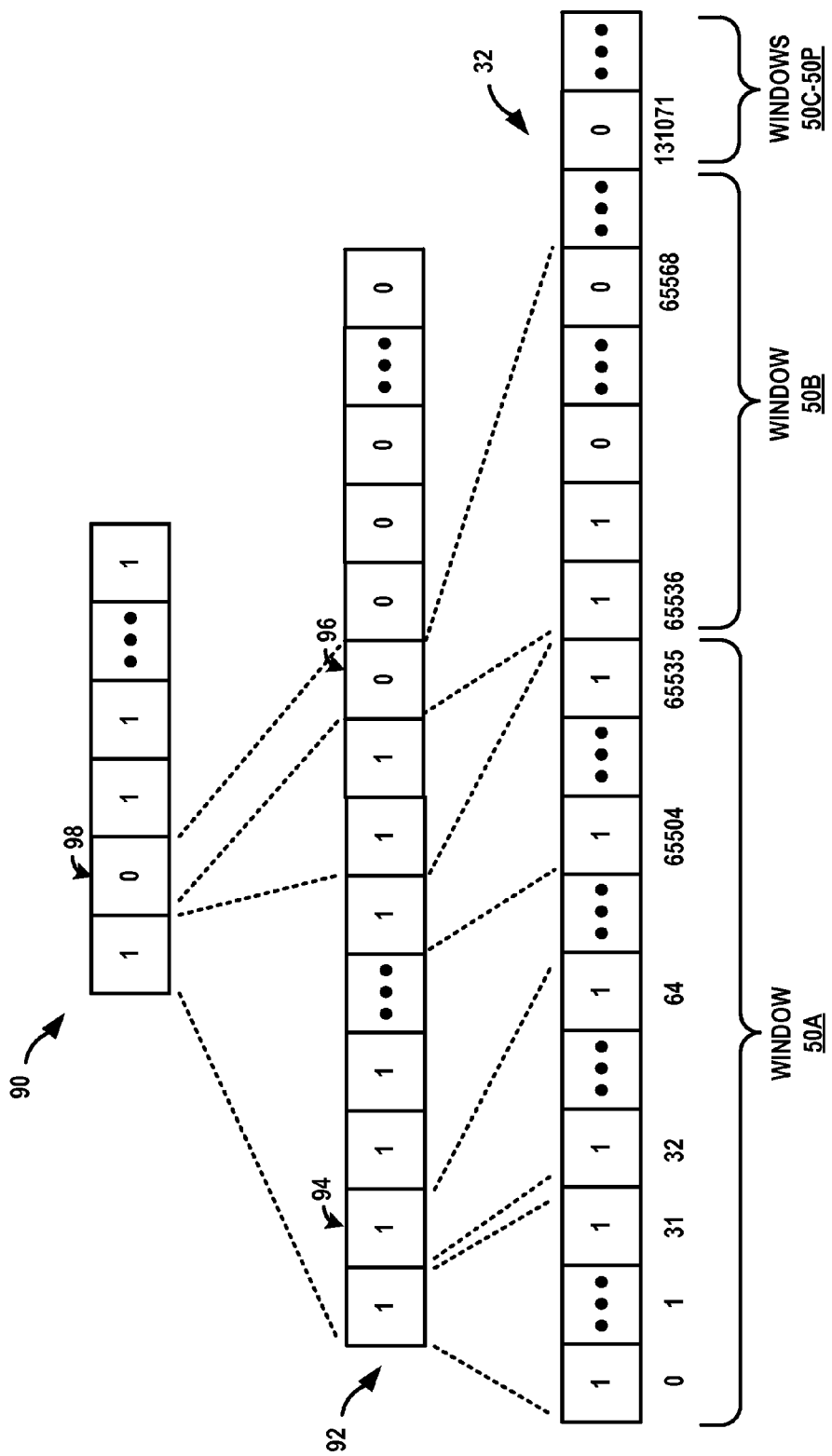
FIG. 4 is a conceptual diagram illustrating techniques for multi-tiered lookup of global identifiers, in accordance with techniques of the present disclosure.

FIG. 4 is a conceptual diagram illustrating techniques for multi-tiered lookup of global identifiers, in accordance with techniques of the present disclosure. Efficient lookup techniques using multiple tiers of data structures are provided to reduce the amount of time required to identify an unallocated global identifier. FIG. 4 includes global identifier map 32 as previously described in FIGS. 1-3. FIG. 4 also includes a secondary tier map 92 and tertiary tier map 90. As shown in FIG. 4, global identifier map 32 includes windows 50A-50P as previously described in the example of FIG. 2.

In some examples, allocation module 30 maintains one or more tiers of maps, such as secondary tier map 92 and tertiary tier map 90. As shown in FIG. 4, an element of secondary tier map 92 indicates whether unallocated global identifiers exist in a unique subset or group global identifiers of global map 32 that corresponds to the element of secondary tier map 92. As one example, each element of secondary tier map 92 corresponds to 32 bits of global map 32 in FIG. 4 and therefore, secondary tier map 92 includes 32,768 elements. For instance, element 94 of secondary tier map indicates whether any unallocated global identifiers exist at bits 32-64 of window 50A of global identifier map 32. A value of "1" at element 94 may indicate that each global identifier associated with an element at index values 32-64 of global identifier map 32 is allocated to one of PFEs 8A. A value of "0", in contrast, indicates that at least one global identifier associated with an element of bits 32-64 of global map 32 is unallocated. For instance, element 96 of secondary tier map 92 indicates that at least one global identifier associated with an element having an index value of 65536-65568 is unallocated. Consequently, allocation module 30 can use secondary tier map 92 to efficiently determine on a group basis whether global identifiers of global map 32 are allocated to PFEs 8. Although the search granularity has been described in FIG. 4 as 32 bits, the search granularity can be any suitable number of bits, e.g., 16, 64, etc.

The techniques described with respect to secondary tier map 92 can be extended to multiple tiers of maps to further improve global identifier lookup. In this way, allocation module 30 may, for example, determine an unallocated global identifier in log 2+1 lookups. For instance, allocation module 30 in the example of FIG. 4 maintains a tertiary tier map 90. As shown in FIG. 4, an element of tertiary tier map 90 indicates whether unallocated identifiers exist in a group of elements of global map 32 that corresponds to one of the elements of secondary tier map 92. As one example, each element of tertiary tier map 90 corresponds to 32 bits of secondary tier map 92 in FIG. 4 and therefore, secondary tier map 92 includes 1,024 elements. For instance, element 98 of tertiary map 90 indicates whether any of elements 0-31 of secondary tier map 92 indicate that global identifiers of global map 32 corresponding to elements 0-31 of secondary tier map 92 are unallocated. Stated another way, element 98 of tertiary tier map 90 indicates whether any unallocated global identifiers exist at bits 1024-2047 of window 50A of global identifier map 32. A value of "1" at element 98 may indicate that each global identifier associated with an element at index values 1024-2047 of global identifier map 32 is allocated to one of PFEs 8A. A value of "0", in contrast, indicates that at least one global identifier associated with an element of bits 1024-2047 of global map 32 is unallocated.

As one example lookup of a global identifier, allocation module 30 can perform a comparison of PFE map 34A and global identifier map 32 using the tiered maps to select a global identifier. Initially, allocation module 30 determines an element of tertiary tier map 90 that indicates a value of "0". In some examples, allocation module 30 determines the element corresponding to the least significant bit of tertiary tier map 30 that has a value of "0". In other examples, allocation module 30 may randomly search tertiary tier map 90 for a value of "0". A value of "0" indicates that at least global identifier of global identifier map 32 that corresponds to element 98 is unallocated.

Upon determining that element 98 indicates a value of "0", allocation module 30 determines an element of secondary tier map 92 that indicates a value of "0." A value of "0" for element 96 in secondary tier map 92 indicates that at least one global identifier of an element corresponding to element 96 is unallocated. For instance, a value of "0" for element 96 indicates that an unallocated global identifier exists in the group of global identifiers 65536-65568 of window 50B. Consequently, when performing the comparison of PFE map 34A to global map 32, allocation module 32 can compare elements corresponding to global identifiers 65536-65568 to PFE map 34A to select an unallocated identifier. For example, allocation module 30 may perform a bitwise OR operation of PFE map 34A and window 50B. Upon performing the bitwise OR operation, allocation module 30 determines a one's complement of the result and determines the index in window 50B of the lowest-ordered bit that is unallocated. The global identifier of window 50B that corresponds to the determined index is selected by allocation module 30 for allocation to PFE 8A. Allocation module 30 allocates the selected global identifier to PFE 8A and sets the element in the global map that corresponds to the global identifier as being allocated.

Allocation module 30 also performs setting of elements in secondary tier map 92 and tertiary tier map 90. For example, upon selecting one of the unallocated global identifiers of global identifiers 65536-65568, allocation module 30 sets the value of element 96 to "1" if, upon allocating the global identifier of 65536-65568, all of the global identifiers of window 50B are allocated. Moreover, if each of the elements of secondary tier map 92 that correspond to element 98 are set to "1", allocation module 30 sets element 98 to "1" to indicate that each of the windows of global map 32 represented by the respective elements of secondary tier map 92 do not include any unallocated global identifiers. In other examples, allocation module 30 can, upon determining that a global identifier in window 50B is unallocated, set element 96 and element 98 each to a value of "0" to indicate that at least one global identifier in window 50B is unallocated. In this way, techniques of the disclosure provide for efficient determination of a portion of global identifier map 32 that includes an unallocated identifier.

Figure 5:
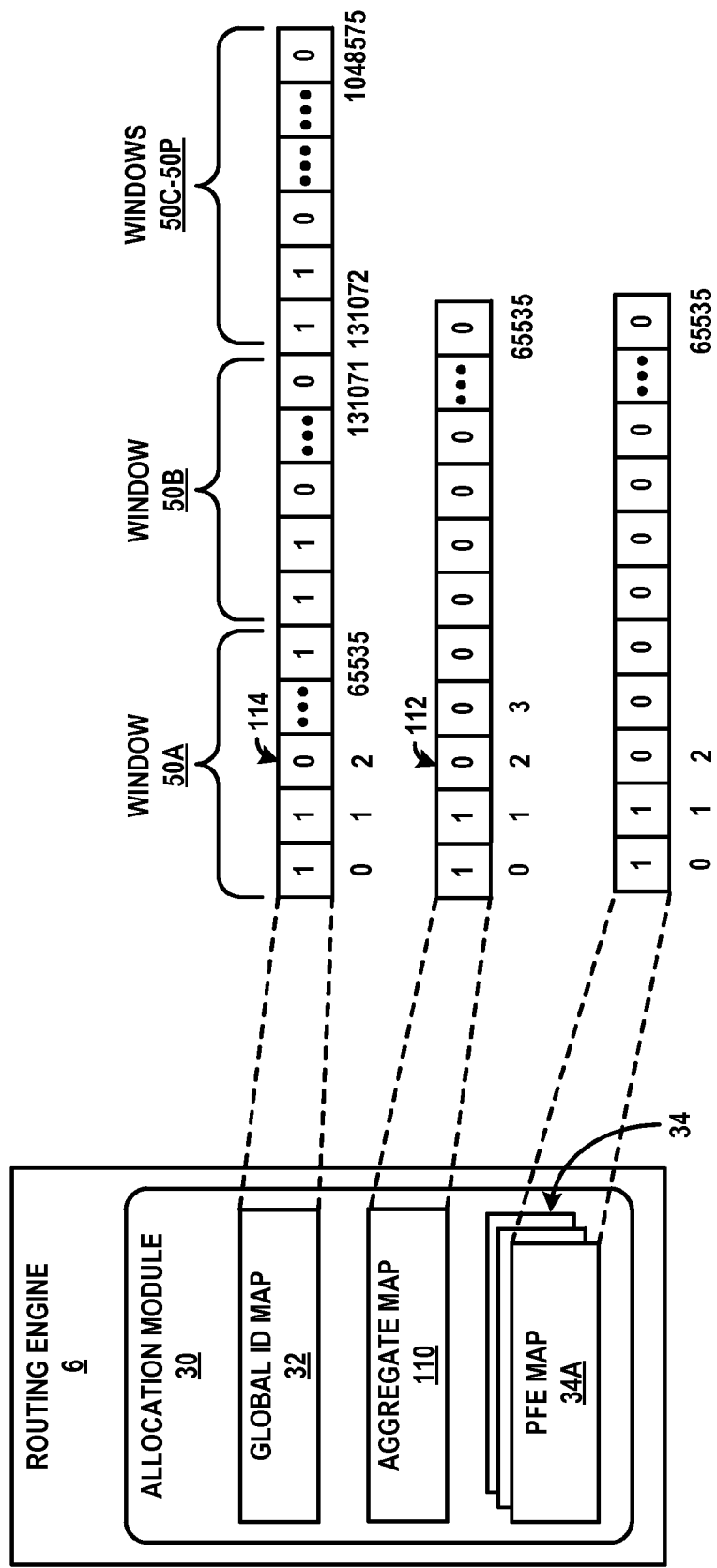
FIG. 5 is a conceptual diagram illustrating techniques for allocating a global identifier to multiple forwarding units, in accordance with techniques of the present disclosure.

FIG. 5 is a conceptual diagram illustrating techniques for allocating a global identifier to multiple forwarding units, in accordance with techniques of the present disclosure. FIG. 5 includes routing engine 6 as previously described in FIGS. 1-3. Routing engine 6 includes allocation module 30, global identifier map 32, aggregate map 110, and PFE maps 34 that include PFE map 34A. PFEs 8 in FIG. 5 support 16-bit logical interface identifiers and routing engine 6 supports 20-bit global identifiers as described in FIGS. 1-4.

In the example of FIG. 5, routing engine 6 can associate a global identifier with an aggregate logical interface. In some examples, an aggregate logical interface is a logical interface that is associated with multiple physical interfaces of one or more forwarding units (e.g., PFEs 8). To allocate a global identifier to each of PFEs 8 that are associated with an aggregate logical interface, allocation module 30 must determine, for a given 16-bit identifier comprising the 16 least significant bits of a 20-bit global identifier (1) whether the 16-bit identifier is unallocated in each of PFE maps 34A and (2) whether a global identifier that includes the 16-bit identifier is unallocated in global identifier map 32.

Allocation module 30 maintains aggregate map 110 to efficiently determine a global identifier that can be associated with an aggregate logical interface. Aggregate map 110 may be implemented as any suitable data structure, such as an array, bitmap, etc. As shown in FIG. 5, aggregate map 110 is implemented as a bitmap.

In the current example, aggregate map 110 includes $2^{16}$ elements because PFEs 8 support 16-bit logical interface identifiers. Each element of aggregate map 110 is addressable by an index value that corresponds to a 16-bit identifier. If, for example, a 16-bit identifier comprising the 16 least significant bits of a 20-bit global identifier is allocated to at least one of PFEs 8, the element of aggregate map 110 correspond to the 16-bit logical identifier is set to "1." Conversely, a value of "0" indicates that none of PFEs 8A have been allocated a global identifier that includes the 16-bit logical identifier. Consequently, a value of "0" for a given element indicates that each 20-bit global identifier of windows 50A-50P that includes the 16-bit logical identifier is unallocated. Therefore, a single element of aggregate map 110 can indicate whether a given 16-bit identifier is unallocated in each of PFE maps 34A and is also included in an unallocated 20-bit global identifier. Thus each element of aggregate map 110 indicates whether, for an element of aggregate map 110 that corresponds to a subset of global identifiers of global map 23, the subset of global identifiers are unallocated, such that each global identifier of the subset of global identifiers comprises a common subset of contiguous bits.

In operation, as allocation module 30 allocates global identifiers to PFEs 8, allocation module 30 updates global identifier map 32 when a global identifier is allocated to one of PFEs 8. Furthermore, in the example of FIG. 5, allocation module 30 determines the 16 least significant bits of the allocated global identifier and sets the bit in aggregate map 110 to indicate that at least one of PFEs 8 has been allocated a global identifier that includes the 16 least significant bits. In this way, allocation module 30 maintains aggregate map 110 to indicate whether any of PFEs 8 are allocated a 16-bit identifier that comprises the 16 least significant bits of a global identifier. Allocation module 30 can also update aggregate map 110 to indicate when a global identifier is later unallocated from one of PFEs 8 such that none of PFEs 8 are allocated 16-bit identifier that comprises the 16 least significant bits of the global identifier.

To illustrate an example of efficient allocation using aggregate map 110, routing engine 6 initially determines that an aggregate logical interface is requested for generation. Rather than comparing PFE map 34A to each of windows 50A-50P to determine whether each global identifier having a group of 16 least significant bits is unallocated, allocation module 30 can determine an element in aggregate map 110 that includes a value of "0". For instance, allocation module 30 determines that element 112 includes a value of "0". Consequently, each of PFE maps 34A is not allocated a global identifier having the 16-least significant bits equal to a decimal value of "2". Therefore, each global identifier in window 50A-50P having the 16 least significant bits equal to a decimal value of "2" are also unallocated.

Allocation module 30 can select, for example, global identifier 00000000000000000010 corresponding to element 114 to associate with an aggregate logical interface. Allocation module 30 can allocate the global identifier to each of PFEs 8. Furthermore, allocation module 30 can set element 114 to indicate that the global identifier has been allocation and can also set element 112 of aggregate map 110 to indicate that at least one of PFEs 8 has been allocated a global identifier having the 16 least significant bits equal to a decimal value of "2".

Figure 6:
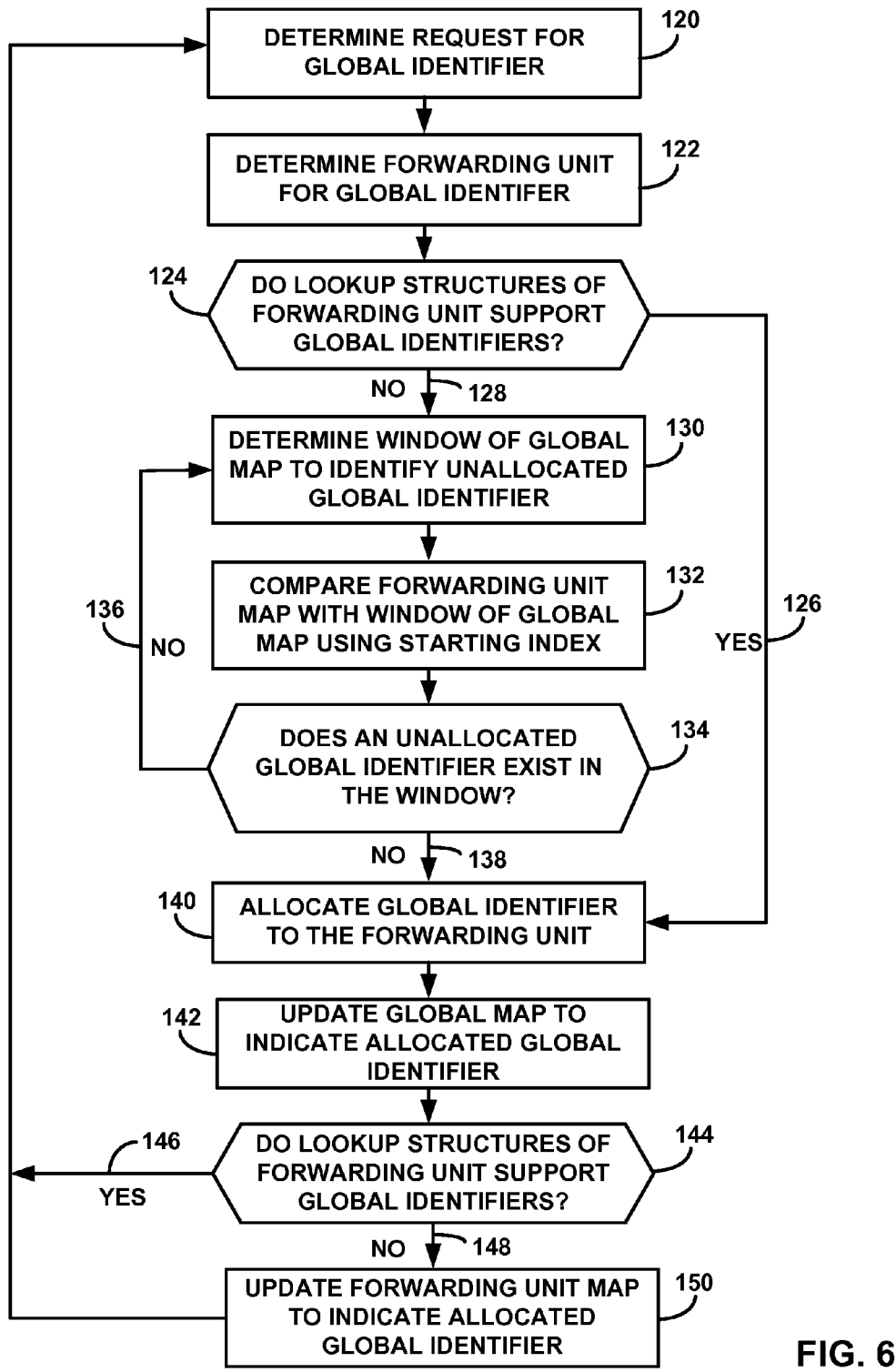
FIG. 6 is a flowchart illustrating example operations of an allocation module, in accordance with techniques of this disclosure.

FIG. 6 is a flowchart illustrating example operations of an allocation module, in accordance with techniques of this disclosure. The example of operations may be performed by allocation module 30 as described in the examples of FIGS. 1-3. Initially, allocation module 30 determines a request for a global identifier to be allocated to a forwarding unit (e.g., PFE 8A) (120). The global identifier can identify a logical interface that is used at PFE 8A. In some examples, an administrator and/or automated agent (e.g., a software and/or hardware module), may initiate the request.

Upon determining the request, allocation module 30 determines which of PFEs 8 will be allocated the global identifier (122). In some examples, allocation module 30 determines the one or more PFEs based on forwarding information in a routing information base (RIB) as described in FIGS. 1-2. In the current example, allocation module 30 determines that PFE 8A will be allocated the global identifier (122).

Allocation module 30 then determines whether lookup structures of PFE 8A support the global identifiers allocated by allocation module 30 (124). For instance, the global identifiers may be 20-bit values, while the lookup structures of PFE 8A may only support 16-bit identifiers. In some examples, allocation module 30 determines lookup identifiers supported by PFE 8A based on version information associated with PFE 8A. In any case, lookup structures of PFE 8A support 20-bit global identifiers (126), then allocation module 30 can determine an unallocated global identifier and allocate the global identifier to PFE 8A (140).

In the current example, lookup structures of PFE 8A do not support 20-bit global identifiers and instead support 16-bit identifiers (128). Consequently, allocation module 30 determine a "window" or group of global identifiers included within global identifier map 32 to select an unallocated global identifier. In the example FIG. 6, global identifier map 32 includes $2^{20-16}=16$ windows of 65,536 identifiers each. In some examples, allocation module 30 randomly determines the window to initially compare with PFE map 34A associated with PFE 8A. In other examples, allocation module 30 determines a bias value that is applied to a numerical identifier of PFE map to identify the starting window. For instance, if global identifier map 32 can include 16 windows and PFE map 8A is associated with an identifier of "9", allocation module 30 can apply a bias value of "7" such that the initial window is selected based on (7+9) % 16=window 5. In other examples, the identifier of "9" may be the bias value itself. Thus the comparison of PFE map 8A would start at window "5" of the 16 windows of global identifier map 32.

Once allocation module 30 has determined window "5," allocation module 30 compares PFE map 34A to window "5" of global identifier map 32 (132). To perform the comparison, allocation module 30 performs a bitwise OR operation on PFE map 34A and window "5" of global identifier map 32. Allocation module 30 then determines a 1's complement of the OR result and determines the least significant bit that indicates an unallocated identifier.

In some examples, allocation module 30 may determine that no unallocated global identifiers exist in window "5" of global identifier map 32 that can be allocated to PFE 8A. For instance, no unallocated global identifiers may exist in window "5" of global identifier map 32 that include a group of 16 least significant bits that are not already allocated in lookup structures of PFE 8 as indicated by PFE map 34A. Thus, each of global identifiers in global identifier map 32 are either already allocated include a group of 16 least significant bits that correspond to a 16-bit identifier in PFE map 8A that is already allocated. Therefore, allocation module 30 will compare PFE map 8A to different window of global identifier map 32 (136). As described above, allocation module 30 may apply any suitable techniques to select the next window such as selecting the subsequent or prior window to window "5", select a random window, or selecting a window based on a bias value. In this way, allocation module 30 can compare PFE map 8A to different windows of global identifier map 32 until an unallocated global identifier is determined that can satisfy the request for a global identifier.

Once allocation module 30 has determined an unallocated global identifier, allocation module 30 allocates the global identifier to PFE 8A (140). In some examples, allocation module 30 sends the global identifier to PFE 8A. To reflect the allocation of the global identifier, allocation module 30 updates global identifier map 32 to indicate that the global identifier is now allocated to PFE 8A (e.g., by setting the value of the element correspond to the global identifier to "1"). Allocation module 30 also determines whether the lookup structures of PFE 8A support 20-bit global identifiers in order to determine whether to update a PFE map associated with PFE 8A (144). For instance, if lookup structures of PFE 8A support 20-bit global identifiers, a PFE map for PFE 8A may not be required and therefore no update to a PFE map is required (146).

In the current example, however, lookup structures of PFE 8A support 16-bit identifiers (148) and therefore, allocation module 30 will update PFE map 34A based on the allocated global identifier (150). For instance, allocation module 30 determines the 16 least significant bits of global identifier 20. Allocation module 30 determines the element of PFE map 34A that corresponds to the 16 least significant bits of the global identifier and sets the element to "1." The value of "1" indicates that a 16-bit local identifier (comprising the 16 least significant bits of the 20-bit global identifier) is allocated to PFE 8A and associated with a logical interface.

The techniques described in this disclosure may be implemented, at least in part, in hardware, software, firmware, or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the techniques of this disclosure.

Such hardware, software, and firmware may be implemented within the same device or within separate devices to support the various techniques described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware, firmware, or software components. Rather, functionality associated with one or more modules or units may be performed by separate hardware, firmware, or software components, or integrated within common or separate hardware, firmware, or software components.

The techniques described in this disclosure may also be embodied or encoded in an article of manufacture including a computer-readable medium encoded with instructions. Instructions embedded or encoded in an article of manufacture including a computer-readable medium encoded, may cause one or more programmable processors, or other processors, to implement one or more of the techniques described herein, such as when instructions included or encoded in the computer-readable medium are executed by the one or more processors. Computer readable storage media may include random access memory (RAM), read only memory (ROM), programmable read only memory (PROM), erasable programmable read only memory (EPROM), electronically erasable programmable read only memory (EEPROM), flash memory, a hard disk, a compact disc ROM (CD-ROM), a floppy disk, a cassette, magnetic media, optical media, or other computer readable media. In some examples, an article of manufacture may include one or more computer-readable storage media. In some examples, a computer-readable storage media may include non-transitory media. The term "non-transitory" may indicate that the storage medium is not embodied in a carrier wave or a propagated signal. In certain examples, a non-transitory storage medium may store data that can, over time, change (e.g., in RAM or cache). Various aspects of this disclosure have been described. These and other aspects are within the scope of the following claims.

What is claimed is:

1. A method comprising:

maintaining, by a network device, a first map that indicates global identifiers that are each allocable to any of a plurality of forwarding units of the network device, and a plurality of second maps, each of the plurality of second maps associated with a respective forwarding unit of the plurality of forwarding units, wherein each respective map of the plurality of second maps indicates local identifiers that are allocated to a respective forwarding unit of the plurality of forwarding units, wherein each of the local identifiers is a portion of two or more of the global identifiers; and allocating to one of the plurality of forwarding units, by the network device, a global identifier indicated by the first map that is not allocated to any one of the plurality of forwarding units by comparing at least one map of the plurality of second maps to one or more portions of the first map to identify the unallocated global identifier of the first map, wherein the at least one map of the plurality of second maps is associated with the one of the plurality of forwarding units, and wherein a portion of the unallocated global identifier is an unallocated local identifier of the one of the plurality of forwarding units.

2. The method of claim 1, wherein the first map comprises a first bitmap, wherein each element of the first bitmap indicates whether a logical interface identifier associated with the element of the first bitmap is allocated to a forwarding unit of the plurality of forwarding units, wherein the logical interface identifiers are based at least in part on index values that identify the elements of the first bitmap; and wherein the at least one map of the plurality of second maps comprises a second bitmap, wherein each element of the second bitmap indicates whether a local identifier associated with the element of the second bitmap is allocated to the one of the plurality of forwarding units.

3. The method of claim 1, wherein allocating the global identifier of the first map to the one of the plurality of forwarding units further comprises:

determining, by the network device, a first portion of the first map, wherein the first portion of the first map comprises a first group of contiguous elements, wherein a quantity of the first group of continuous elements is equal to a second quantity of contiguous elements of the at least one map of the plurality of second maps;

determining, by the network device, an index value of a beginning element of the first portion of the first map, wherein the beginning element is associated with a lowest index value of index values associated with the elements of the first portion, wherein the index value is determined based at least in part on a multiple of a quantity of bits of logical interface identifiers supported by a lookup structure of the one of the plurality of forwarding units; and comparing, by the network device, the at least one map of the plurality of second maps to the first portion of the first map to determine an index value of an unallocated element in the first portion of the first map to select as the global identifier.

4. The method of claim 3, wherein the first quantity of contiguous elements is based at least in part on a quantity of local identifiers supported by a lookup structure of the one of the plurality of forwarding units.

5. The method of claim 3, wherein comparing the at least one map of the plurality of second maps to the first portion of the first map further comprises:

determining a first value, by the network device, that comprises a result of a bitwise logical OR operation of each element of the at least one map of the plurality of second maps and each corresponding element of the first portion of the first map, for each index value of each element of the first portion of the first map that is a multiple of each respective index value of each element of the at least one map of the plurality of second maps;

determining a second value, by the network device, that comprises a least significant bit of a complement of the first value; and determining, by the network device, an unallocated global identifier based at least in part on the second value.

6. The method of claim 3, further comprising:

determining, by the network device, the first portion of the first map does not include an unallocated global identifier that is associated with an unallocated local identifier of the one of the plurality of forwarding units;

determining, by the network device, a second portion of the first map, wherein the second portion of the first map comprises a second group of contiguous elements, wherein the quantity of the second group of continuous elements is equal to the second quantity of contiguous elements of the at least one map of the plurality of second maps; and comparing, by the network device, the at least one map of the plurality of second maps to the second portion of the first map to determine an index value of an unallocated element in the second portion of the first map to select as the logical interface identifier.

7. The method of claim 6, wherein determining the second portion of the first map further comprises:

determining, by the network device, a bias value;

determining, by the network device, an index value of a beginning element of the second portion of the first map based at least in part on the bias value, wherein the beginning element is associated with a lowest index value of index values associated with the elements of the second portion, wherein the index value is determined based at least in part on a multiple of a quantity of bits of logical interface identifiers supported by the lookup structure of the one of the plurality of forwarding units.

8. The method of claim 1, wherein one of the global identifiers comprises a first group of bits;

wherein one of the local identifiers comprises a second group of bits; and wherein the one of the local identifiers comprises a group of least significant bits of the one of the global identifiers.

9. The method of claim 1, further comprising:

associating, by the network device, the logical interface with a physical interface of the packet forwarding engine, based at least in part on the allocated global identifier.

10. The method of claim 1, further comprising:

installing, by the network device, the logical interface identifier within a lookup structure of the packet forwarding engine.

11. The method of claim 1, further comprising:

determining, by the network device, a third map comprising a plurality of elements, wherein each of the plurality of elements of the third map indicates whether at least one global identifier of a unique subset of global identifiers of the first map is unallocated, wherein the first map comprises a plurality of unique subsets of global identifiers;

determining, by the network device, one of the plurality of elements of the third map that indicates at least one global identifier is unallocated in one of the unique subsets of global identifiers; and determining, by the network device, that the first portion of the first map comprises the one of the unique subsets of global identifiers.

12. The method of claim 1, further comprising:

determining, by the network device, a third map comprising a plurality of elements, wherein a quantity of the plurality of elements of the third map is equal to a second quantity of elements of the at least one map of the plurality of second maps, wherein each element of the plurality of elements of the third map indicates whether, for an element of the third map that corresponds to a subset of global identifiers of the global map, the subset of global identifiers are unallocated, wherein each global identifier of the subset of global identifiers comprises a common subset of contiguous bits;

determining, by the network device, one of the plurality of elements of the third map that indicates each global identifier of a subset of global identifiers correspond to the one of the elements is unallocated; and allocating, by the network device, the unallocated global identifier to each of the plurality of forwarding units.

13. The method of claim 1, further comprising:

detecting, by the network device, a request to allocate a global identifier of the global identifiers to at least one of the plurality of forwarding units;

responsive to comparing the at least one map of the plurality of second maps to a first portion of the first map to identify a first global identifier of the first map that satisfies the request, determining, by the network device, that the first global identifier is currently allocated;

responsive to determining that the first global identifier is currently allocated, comparing the at least one map of the plurality of second maps to a second portion of the first map to identify a second global identifier of the first map that satisfies the request, wherein the first global identifier and second global identifier are not contiguous global identifiers; and responsive to determining that the second global identifier is unallocated, allocating the second global identifier to the at least one of the plurality of forwarding units as the global identifier for the request.

14. A network device comprising:

a control unit having one or more hardware-based microprocessors; and an allocation module executable by the microprocessors, wherein the allocation module maintains a first map that indicates global identifiers that are each allocable to any of a plurality of forwarding units of the network device, and a plurality of second maps, each of the plurality of second maps associated with a respective forwarding unit of the plurality of forwarding units, wherein each respective map of the plurality of second maps indicates local identifiers that are allocated to a respective forwarding unit of the plurality of forwarding units, wherein each of the local identifiers is a portion of two or more of the global identifiers; and wherein the allocation module allocates to one of the plurality of forwarding units, by the network device, a global identifier indicated by the first map that is not allocated to any one of the plurality of forwarding units by comparing at least one map of the plurality of second maps to one or more portions of the first map to identify the unallocated global identifier of the first map, wherein the at least one map of the plurality of second maps is associated with the one of the plurality of forwarding units, and wherein a portion of the unallocated global identifier is an unallocated local identifier of the one of the plurality of forwarding units.

15. The network device of claim 14,
wherein the first map comprises a first bitmap, wherein each element of the first bitmap indicates whether a logical interface identifier associated with the element of the first bitmap is allocated to one of the plurality of forwarding units, wherein the logical interface identifiers are based at least in part on index values that identify the elements of the first bitmap; and
wherein the at least one map of the plurality of second maps comprises a second bitmap, wherein each element of the second bitmap indicates whether a local identifier associated with the element of the second bitmap is allocated to the one of the plurality of forwarding units.

16. The network device of claim 14,
wherein the allocation module determines a first portion of the first map, wherein the first portion of the first map comprises a first group of contiguous elements;
wherein the allocation module determines an index value of a beginning element of the first portion of the first map, wherein the beginning element is associated with a lowest index value of index values associated with the elements of the first portion, wherein the index value is determined based at least in part on a multiple of a quantity of bits of logical interface identifiers supported by a lookup structure of the one of the plurality of forwarding units; and
wherein the allocation module compares the at least one map of the plurality of second maps to the first portion of the first map to determine an index value of an unallocated element in the first portion of the first map to select as the global identifier.

17. The network device of claim 16, wherein the first quantity of contiguous elements is based at least in part on a quantity of local identifiers supported by a lookup structure of the one of the plurality of forwarding units.

18. The network device of claim 16,
wherein the allocation module determines a first value that comprises a result of a bitwise logical OR operation of each element of the at least one map of the plurality of second maps and each corresponding element of the first portion of the first map, for each index value of each element of the first portion of the first map that is a multiple of each respective index value of each element of the at least one map of the plurality of second maps;
wherein the allocation module determines a second value that comprises a least significant bit of a complement of the first value; and
wherein the allocation module determines an unallocated global identifier based at least in part on the second value.

19. The network device of claim 16,
wherein the allocation module determines the first portion of the first map does not include an unallocated global identifier that is associated with an unallocated local identifier of the one of the plurality of forwarding units;
wherein the allocation module determines a second portion of the first map, wherein the second portion of the first map comprises a second group of contiguous elements, wherein the quantity of the second group of continuous elements is equal to the second quantity of contiguous elements of the at least one map of the plurality of second maps; and
wherein the allocation module compares the at least one map of the plurality of second maps to the second portion of the first map to determine an index value of an unallocated element in the second portion of the first map to select as the logical interface identifier.

20. The network device of claim 19,
wherein the allocation module determines a bias value;
wherein the allocation module determines an index value of a beginning element of the second portion of the first map based at least in part on the bias value, wherein the beginning element is associated with a lowest index value of index values associated with the elements of the second portion, wherein the index value is determined based at least in part on a multiple of a quantity of bits of logical interface identifiers supported by the lookup structure of the one of the plurality of forwarding units.

21. The network device of claim 14,
wherein one of the global identifiers comprises a first group of bits;
wherein one of the local identifiers comprises a second group of bits; and
wherein the one of the local identifiers comprises a group of least significant bits of the one of the global identifiers.

22. The network device of claim 14,
wherein the allocation module associates the logical interface with a physical interface of the packet forwarding engine, based at least in part on the allocated global identifier.

23. The network device of claim 14,
wherein the allocation module installs the logical interface identifier within a lookup structure of the packet forwarding engine.

24. The network device of claim 14,
wherein the allocation module determines a third map comprising a plurality of elements, wherein each of the plurality of elements of the third map indicates whether at least one global identifier of a unique subset of global identifiers of the first map is unallocated, wherein the first map comprises a plurality of unique subsets of global identifiers;
wherein the allocation module determines one of the plurality of elements of the third map that indicates at least one global identifier is unallocated in one of the unique subsets of global identifiers; and wherein the allocation module determines that the first portion of the first map comprises the one of the unique subsets of global identifiers.

25. The network device of claim 14,
wherein the allocation module determines a third map comprising a plurality of elements, wherein a quantity of the plurality of elements of the third map is equal to a second quantity of elements of the at least one map of the plurality of second maps, wherein each element of the plurality of elements of the third map indicates whether, for an element of the third map that corresponds to a subset of global identifiers of the global map, the subset of global identifiers are unallocated, wherein each global identifier of the subset of global identifiers comprises a common subset of contiguous bits;
wherein the allocation module determines one of the plurality of elements of the third map that indicates each global identifier of a subset of global identifiers correspond to the one of the elements is unallocated; and
wherein the allocation module allocates the unallocated global identifier to each of the plurality of forwarding units.

26. A non-transitory computer-readable medium comprising instructions that, when executed, cause one or more processors of a network device to:

maintain a first map that indicates global identifiers that are each allocable to any of a plurality of forwarding units of the network device, and a plurality of second maps, each of the plurality of second maps associated with a respective forwarding unit of the plurality of forwarding units, wherein each respective map of the plurality of second maps indicates local identifiers that are allocated to a respective forwarding unit of the plurality of forwarding units, wherein each of the local identifiers is a portion of two or more of the global identifiers; and allocate to one of the plurality of forwarding units, by the network device, a global identifier indicated by the first map that is not allocated to any one of the plurality of forwarding units by comparing at least one map of the plurality of second maps to one or more portions of the first map to identify the unallocated global identifier of the first map, wherein the at least one map of the plurality of second maps is associated with the one of the plurality of forwarding units, and wherein a portion of the unallocated global identifier is an unallocated local identifier of the one of the plurality of forwarding units.

* * * * *